United States Patent [19]

Shimizu

[11] Patent Number: 5,159,444
[45] Date of Patent: Oct. 27, 1992

[54] APPARATUS FOR READING AND REPRODUCING A COLOR IMAGE

[75] Inventor: Norimitu Shimizu, Saitama, Japan

[73] Assignee: Fuji Xerox Co., Ltd., Tokyo, Japan

[21] Appl. No.: 693,578

[22] Filed: Apr. 30, 1991

Related U.S. Application Data

[63] Continuation-in-part of Ser. No. 295,707, Jan. 11, 1989, abandoned.

[30] Foreign Application Priority Data

Jan. 19, 1988 [JP] Japan ................... 63-74861

[51] Int. Cl.$^5$ ........................... G03F 3/10; G03F 3/08
[52] U.S. Cl. ......................................... 358/76; 358/80
[58] Field of Search ................. 358/75, 751 J, 76, 77, 358/80, 102, 474, 909, 450, 462, 296, 300, 903; 355/37, 39, 40

[56] References Cited

U.S. PATENT DOCUMENTS

| | | | |
|---|---|---|---|
| 4,514,768 | 4/1985 | Ishizawa | 358/296 |
| 4,583,186 | 4/1986 | Davis et al. | 364/526 |
| 4,672,459 | 6/1987 | Kudo | 358/227 |
| 4,712,909 | 12/1987 | Oshikoshi | 355/20 |
| 4,760,467 | 7/1988 | Marazzi et al. | 358/303 |
| 4,769,694 | 9/1988 | Oshikoshi | 358/75 |
| 4,942,473 | 7/1990 | Zeevi et al. | 358/213.26 |

FOREIGN PATENT DOCUMENTS

| | | |
|---|---|---|
| 0029327 | 5/1981 | European Pat. Off. . |
| 2078411 | 1/1982 | United Kingdom . |
| 2082014 | 2/1982 | United Kingdom . |
| 2089165 | 6/1982 | United Kingdom . |

*Primary Examiner*—James J. Groody
*Assistant Examiner*—Safet Metjahic
*Attorney, Agent, or Firm*—Finnegan, Henderson, Farabow, Garrett and Dunner

[57] ABSTRACT

An image reader comprises an image data output device that reads image data from an original film, a data processing device, a microcomputer which prepares character data, a comparator for combining image data and character data, and a printer device which combines the image data and character data to produce a color copy with characters printed thereon. The image reader is capable of reading either positive or negative film. The character data can be displayed in the virtual image area of the microcomputer screen, prior to printing the copy. The characters on the copy can be white or full-color.

3 Claims, 8 Drawing Sheets

APPARATUS FOR READING AND REPRODUCING A COLOR IMAGE

This is a Continuation-in-Part of pending prior application Ser. No. 07/295,707, filed on Jan. 11, 1989 for "Image Reader", which is incorporated herein by reference now abandoned.

BACKGROUND OF THE INVENTION

1. Field of the Invention

The present invention relates to an image reader and more particularly to an image reader that is capable of producing a large size, color print based on the image data read, for example, from an image on 35 mm camera film.

2. Description of the Related Art

Devices for reproducing image data through the projection of images of film slides are known. In addition to the direct reproduction of a film slide image on a screen, a television camera can be used to read an image and reproduce the image data on a television.

In the case described above, in which a film slide image is reproduced as a television image, although the image scan is relatively coarse, it is perceived by the human eye as a relatively vivid image. Yet, when an attempt is made to produce a hard copy of the image, the coarseness of the resultant color copy image, caused by the low number of line image sensors and other such image data reader elements, is noticeable to the eye. The coarseness is quite apparent when compared to a photograph.

Further, full color printers used for producing color copies of a color original are capable of producing excellent color copies having a relatively minimal enlargement. However, in using these color copiers, multiple scans of the original are required to adequately copy the cyan, magenta, yellow and black images. Thus, a process is used by which color data is obtained from separate scans for each color by the image reader. The copy paper is introduced into a fixing device and a color copy is produced by fixing the color toner layers on the copy paper.

Additional reproduction devices include printers that are connected to computers which produce color copies from the computer's output. An example of this type of device is the "Ba-sateku" electrostatic printer (trade name). However, a full color printer of this type requires a complex computer equipment configuration, which can be prohibitively expensive.

Clearly, it is very difficult to readily produce a color copy from a chosen image data media, such as camera film negatives, positive film, and color photographs, using the types of prior art devices mentioned above.

Further, because of problems with the number of line image sensors used, the color copy of an image reproduced using a color copy reproduction device is frequently coarse, not yielding as sharp an image as a photograph. Moreover, as the size of a color reproduction increases, the quality of the copy becomes more unsatisfactory.

Further, because of the constraints in enlarging an original when using electronic photograph reproduction devices, such as full color printers, a color enlargement frequently cannot be produced in a required size. In the case of an electrostatic printer connected to a computer, a color copy cannot be made directly from certain originals, such as color film.

It is an object of the present invention to eliminate the drawbacks found in the prior art devices described above.

A further object of the present invention is to provide a device that is capable of using negative film, positive film, or a color photograph as an original.

A further object of the present invention is to provide a device that will easily reproduce a large color copy of a chosen size and allow simultaneous printing of character data created on a microcomputer screen on the color copy.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

SUMMARY OF THE INVENTION

To achieve the foregoing objects, and in accordance with the purposes of the invention as embodied and broadly described herein, an image reader is provided comprising means for image data output that reads image data from an original and outputs the image data for each line as an electrical signal, image signal processing means for processing the image data from said image data output means, a microcomputer device that prepares character data to be entered onto an image screen and outputs the character data to a printer means, a combining means for combining the character data and image data, and a printer means that prints the combined image data and character data on a color copy. Further, the color copy can be of a selected enlargement size produced on the basis of the image data output from said means of image data output and the character data output from said microcomputer.

Further, the image reader of the present invention includes a means for combining and transmitting character data when image data and character data are combined. It displays a bit pattern of the character data formed in the virtual image area of the microcomputer screen.

Further, the image reader of the present invention, can read either positive film or negative film. The image reader reads the image with line image sensors and outputs the image to a means for processing the image as an electrical signal.

With the preferred embodiment of the present invention, it is possible to linearly analyze the bit map data in the virtual image area of the microcomputer screen, sequentially obtain the color indication from the change point address of the bit pattern at one end of the line and the change point, and by outputting said address color indicator data simultaneously as the printer prints colors, produce a multicolored output.

Further, the reader device of the present invention can input instructions to said address and color data to decide whether or not to give priority to the image data.

By having the structure described above, that is by having a means for outputting a film image in relation to a printer connected to a microcomputer, and by combining data output from both of these devices as electrical signals, the image reader of the invention is capable of reproducing full color prints with embedded text.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 1:
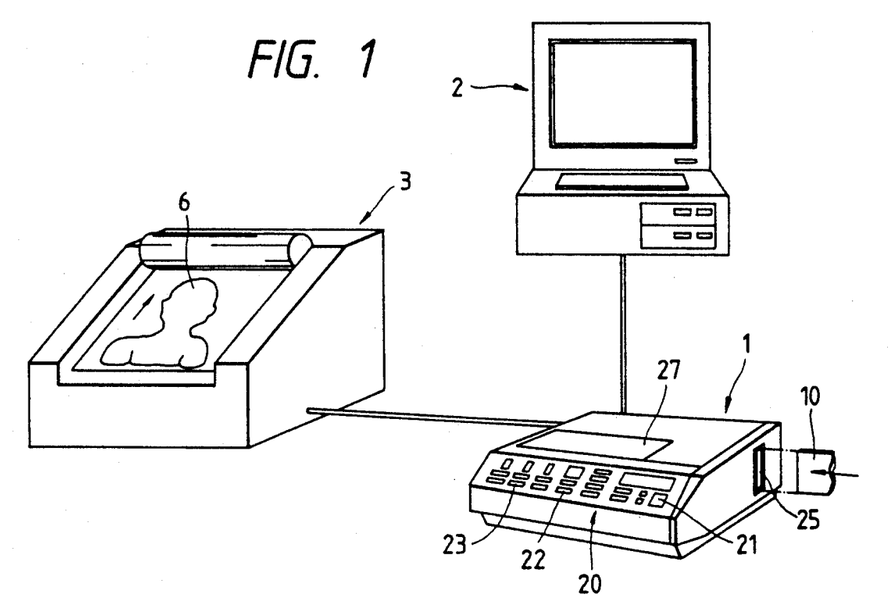
FIG. 1 is a schematic showing the configuration of the image reader of the present invention.

As shown in FIG. 1, the system of the present invention is comprised of a film scanner 1 which reads the film image and which serves as the means for image data output; a microcomputer 2 which forms a single unit with said scanner 1 and which serves as an image processing device for image data processing, wherein said microcomputer is used to create the characters to be added to the image, to position these characters on the image, and to select their color; and an electrostatic plotter 3 used for producing full color prints.

Figure 2:
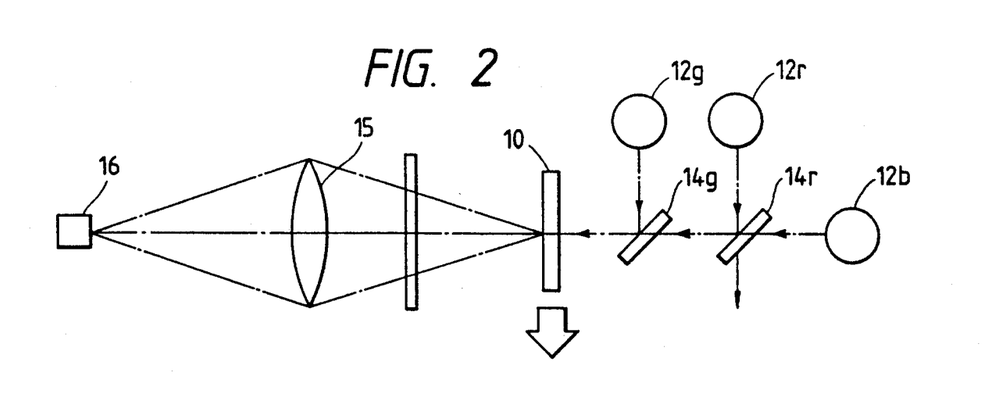
FIG. 2 is a diagram of the film scanner and image reader of the present invention.

The image reader of the present invention operates as follows: the film scanner 1 reads the image data from an original image, for example, film 10, and inputs the obtained image data into the image processor, where the electrical signals from film scanner 1 are output and directed as printing data to electrostatic plotter 3. The image data read from film 10 is processed in the plotter 3, as shown in FIG. 2.

In the image reader of the preferred embodiment, the image on film 10 is read row by row by line image sensors, and the read image data is analyzed as the density data for each point in image processor 2 of FIG. 1. The tone and density of each point is reproduced in relation to the segment corresponding to the print column.

In such a case, the image density is expressed as a number of dots for print section 6 in relation to the specified section of said film 10 and is printed by the printing element of said plotter 3 as dots corresponding to the density data percentage.

In the preferred embodiment of the image reader described above, the image data read by the film scanner, which is made to correspond with the electrostatic plotter 3 image recorder, is processed as a signal at the image processor, and the image data read by said film scanner 1 is then input into the image processor at the rate of light transmission of the film.

Further, in the image reader of the present invention, a common microcomputer can be used as the microcomputer 2 which is connected in parallel with film scanner 1 and used for the purpose of inserting character data with the film image. The microcomputer provides for the positioning on the microcomputer image screen of the character data to be inserted on the color copy and for character color selection, and outputs this data along with the image data in the direction of the electrostatic plotter 3.

An example of a film slide reader, such as can be used as the film scanner 1 of the present invention, is shown in FIG. 2. The film slide 10 used in this film scanner is a positive film used in standard slide equipment.

The film scanner of the present invention, as shown in FIG. 2, uses three fluorescent bulbs 12 as the light source. These lamps consist of a blue lamp 12b, red lamp 12r, and green lamp 12g. A red mirror 14r and green mirror 14g are positioned to control the light irradiated from each lamp.

These mirrors 14r and 14g are formed as half mirrors and may be, for example, the commercially available "Daikurokku Mirror" (trade name). In addition, it is possible to use other mirror devices if such mirrors have the characteristic of reflecting only specific light.

Further, the lamp device of the invention is configured so that the blue lamp light is on the light axis of the lens, while the other two lamps are reflected into the light axis through the mirrors. Accordingly, the light from green lamp 12g and red lamp 12r is reflected from mirror 14g and mirror 14r, respectively, which are disposed so that the light passes through an image on film 10. Further, in order to maintain the intensity of each of the lamps constant, heaters are attached which preserve the lamps at a constant temperature.

Lens 15 is located on the light axis and the film retainer which holds film 10 is located at the focal point of lens 15. Further, the line image sensor 16 is located on the focal point of the light passing through lens 15. A CCD line image sensor, which is known, may be used as line image sensor 16. The light data read by the line image sensor is converted to electrical signals and input into the image data processor.

The line image sensor of the present invention is structured so that it is capable of reading multiple lines simultaneously. The operation of image data processing in relation to the lines read takes place at the image data processor.

The relationship between the lamps, mirrors, lenses, and the line image sensor is shown in FIGS. 1 and 2. Film 10 is scanned in the direction of the arrow in order to read the image data.

In addition, by structuring the device to read reflected light, the means of image data output of the present invention is capable of reading color photographs, as well as film transparencies, to obtain image data. In this case, a photograph holder is used in place of the film holder, and the device is structured so that the lamps, line image sensor, etc., are located at a designated angle in relation to the surface of the photograph to be read, the light from the lamps is directed at the surface of the photograph, and the reflected light is condensed at the line image sensor.

In the example shown in FIG. 1, there is an insert port 25 on the side of the film scanner 1 for the insertion of film 10. Film 10 is inserted into insert port 25, which can be set from the image reader described above. The control panel 20 on the film scanner 1 has a start button 21, a button for selecting the number of copies, an enlargement button 22, color adjustment button 23, and other typical selection buttons. The image data output to the electrostatic plotter 3 can be specified using each of the buttons located on this control panel 20.

The enlargement setting button 22 is set to correspond to the size of the paper being used for producing the copy at electrostatic plotter 3 and the section of the image area within the photograph to be reproduced. In the case of normal copier machines, the enlargement setting is expressed as a ratio of copy size to the size of the original; however in the case of the device of the present invention, the enlargement setting is expressed as the area of the film image surface to be read, thus differing from general copier machines.

Further, because it is primarily color slide film that is used with the film scanner 1 of the present invention, an illumination device 27 which houses a means of light generation is included in order to verify the film image. Thus, verification of the film image can be easily carried out using illumination device 27.

Figure 3:
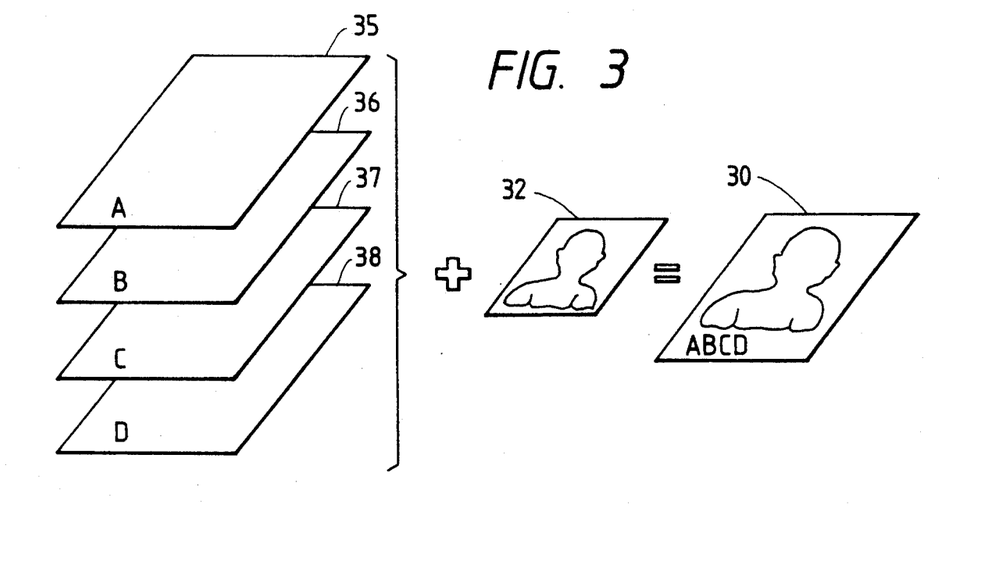
FIG. 3 is a graphic depiction of the inputs and output of the present invention.

As shown in FIG. 3, in the preferred embodiment of the image reader of the present invention, the image data 32 obtained by the film scanner 1 and the character data 35-38 output by microcomputer 2 are combined to produce color copy 30. In the device of the present invention, the character data output from the microcomputer is output sequentially as black data 35, cyan data 26, red data 37, and yellow data 38. The character data from the microcomputer 2 and the image data from film scanner 1 are printed by the electrostatic plotter 3 in color.

Of course, in the device of the present invention, in the case in which the character data output from microcomputer 2 is limited to a single color, the character entry is carried out simultaneously. In this case, the image data is printed over a number of times using each color, but the character data is carried out in one printing.

During the color copy production as described above, and as shown in FIG. 4, in contrast to image data 32, the character data 35 output by microcomputer 2 is established in a character data region of the image surface, and the other image is output as a dummy region.

Figure 4:
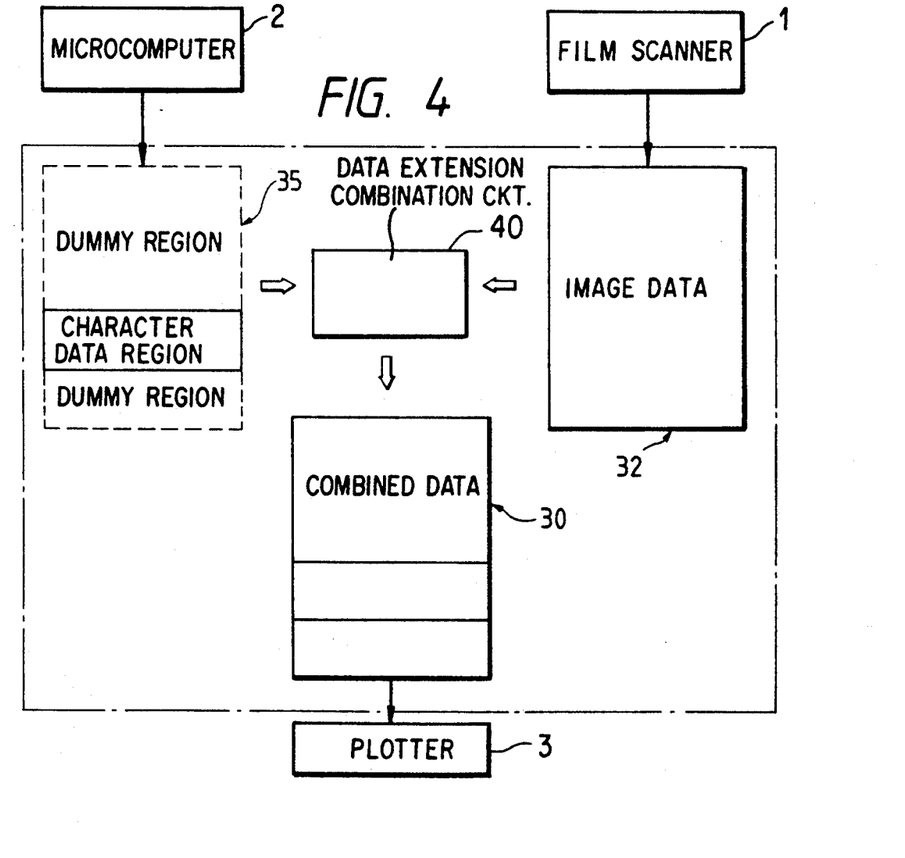
FIG. 4 is a diagram of the image production conditions in the device of the present invention.

Thus, it is structured so that only the region established by the above-mentioned character data 35 is given priority and can be inserted as character data in the image data. Accordingly, as described above, when data is output from both of the output devices, the character data is inserted onto the image data and output by electrostatic plotter 3 as composite data 30, with color character data printed onto the color copy.

Figure 5:
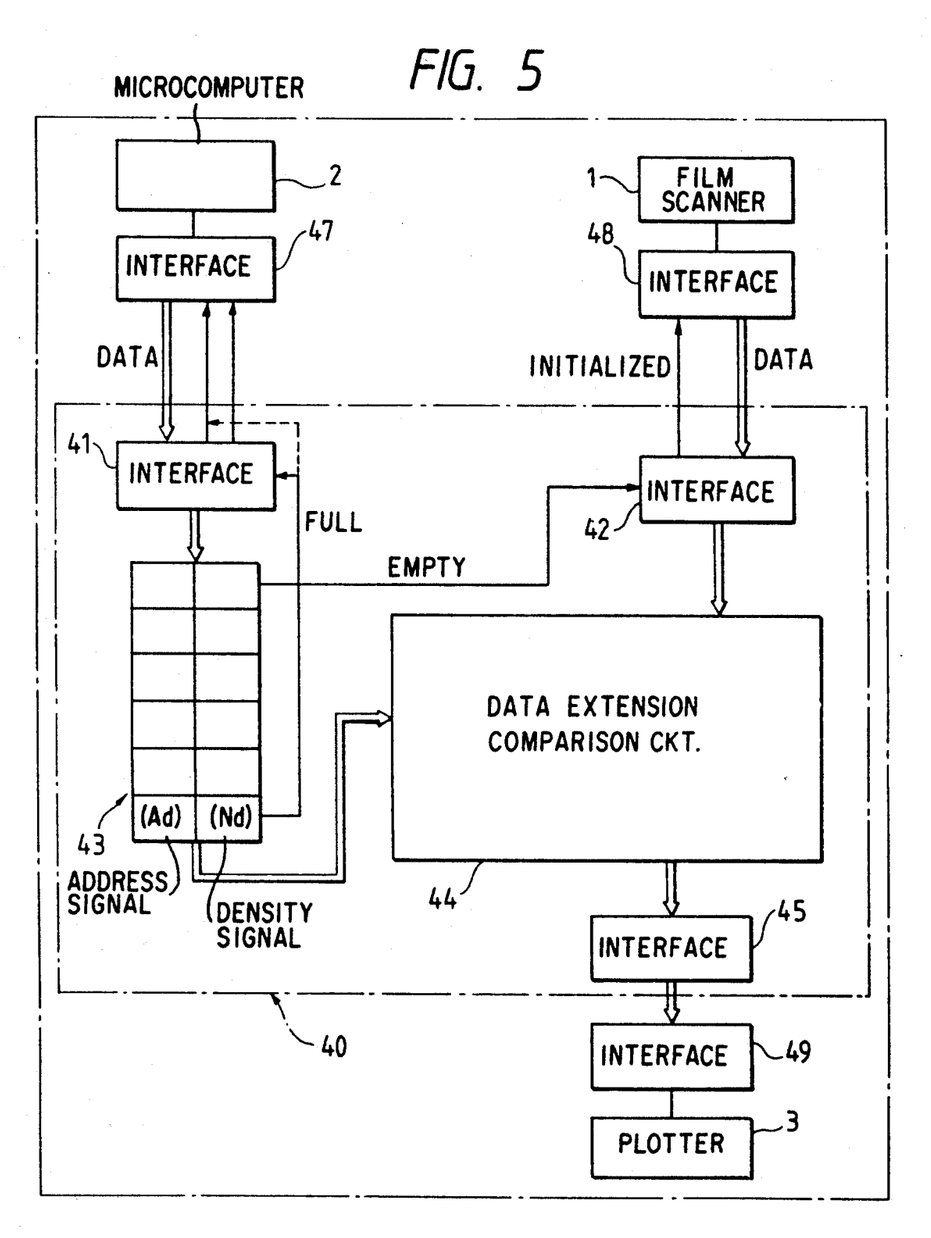
FIGS. 5 and 6 are functional block diagrams of the circuit of the controller of the present invention.

In the image processing device of the present invention, as shown in FIG. 5, the output from film scanner 1 and microcomputer 2 passes through each interface 47 and 48 and is input into comparator 40 which is preferably located within the film scanner but may be housed in any of the components of the present invention. The comparator 40 is thus shown as a separate component in FIGS. 4-7. The signal output of interfaces 47 and 48 are input into data expansion comparator circuit 44 through internal buffer 43, where image data processing takes place and is output through interfaces 45 and 49 which ar well-known in the art to electrostatic plotter 3 as an image data input signal.

Figure 6:
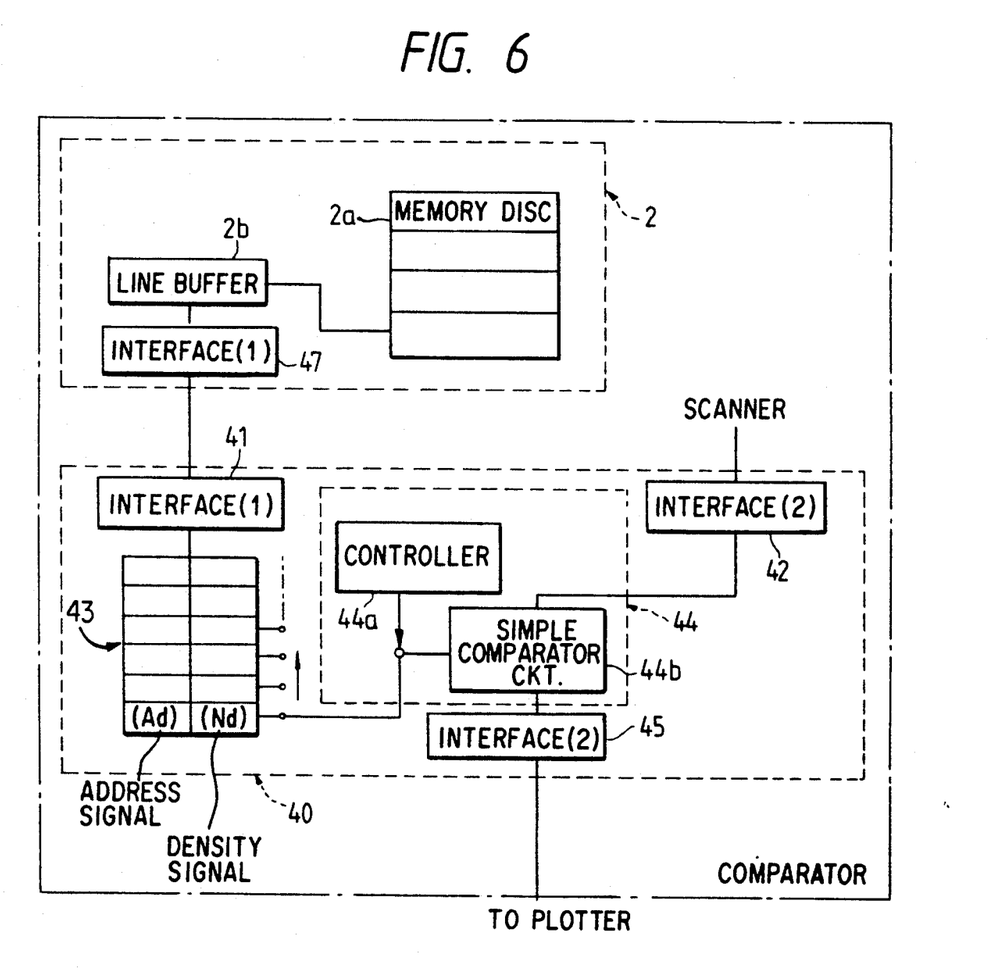

In the processing of these signals, as shown in FIG. 6, the image data is temporarily stored on the memory disk 2a of the microcomputer 2 and is output to comparator 40 through line buffer 2b and interface 47. The image data output by the film scanner 1 and the microcomputer 2 are input into data expansion comparator circuit 44 in the comparator 40 and output to the electrostatic plotter through controller 44a and simple comparator circuit 44b of the data expansion comparator circuit 44, and interface 45 which is well-known in the art.

Figure 7:
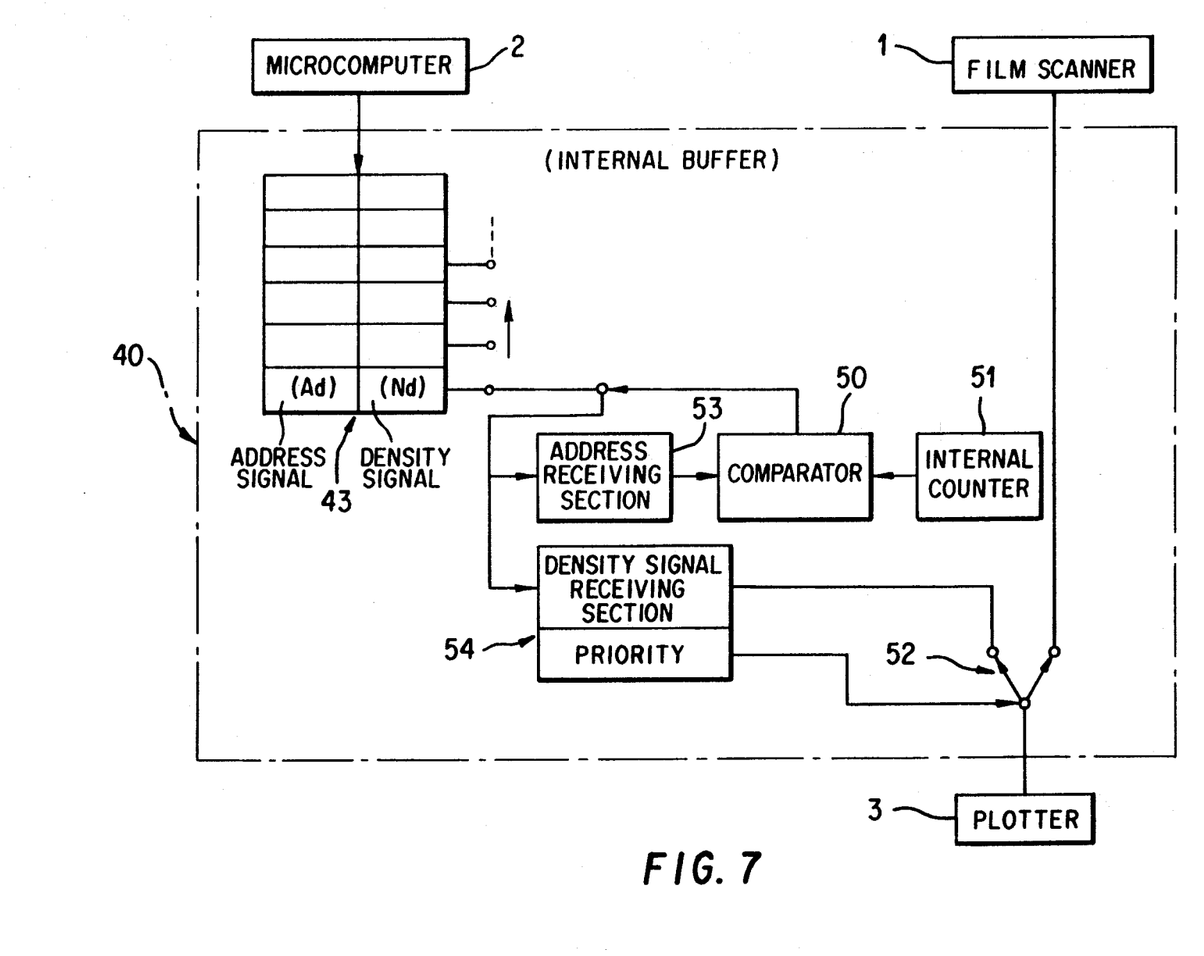
FIG. 7 is a functional block diagram of the circuit of the controller of the present invention.

FIG. 7 shows, as a simplified circuit, means for processing the signal from the scanner 1 and the microcomputer 2 according to the preferred embodiment. In the reader of the present invention, the data inputted into a processing section from the film scanner through an internal buffer includes signals related only to the dot structure of the image. On the other hand, the signals inputted into the internal buffer 43 from the microcomputer 2 include data related to an address signal Ad and a density signal Nd, and data of the density signal Nd includes signals of a priority Pr.

In the circuit diagram shown in FIG. 7, a comparator 50 and an internal counter 51 are provided so that the comparator 50 functions to extract signals stored in the internal buffer 43 successively from the bottom of the buffer 43 to the top thereof in response to signals from the internal counter 51. Among the signals extracted from the internal buffer 43 as described above, the address signal Ad is input into an address receiving section 53, and the density signal Nd is input into a density signal receiving section 54. As the density signals Nd which are input into the density signal receiving section 54 include data related to the density signal Nd and signals related to the priority Pr, the density signals Nd are divided into two signals so that the signals related to the priority Pr are used as an operation signal to operate an image signal switching section 52.

In the image signal switching section 52, the image data signals from the scanner 1 and the character data signals from the microcomputer 2 are alternatively selected on the basis of the priority Pr so that the selected signals are output toward the plotter 3. In this embodiment, the signals from the scanner 1 and from the microcomputer 2 are processed on the basis of the priority output from the microcomputer 2. Among the output signals from the microcomputer 2, the change point coordinates of the image data which is output toward the plotter ar set according to data of the priority contained in the density signal so that it can be determined whether the priority data causes character data or image data to be output. Further, in the case of writing character data according to the above signals, the characters are capable of being set as a desired color character data. In the case of the input of these types of characters, it is possible to use selected character data set using the microcomputer 2.

Figure 8:
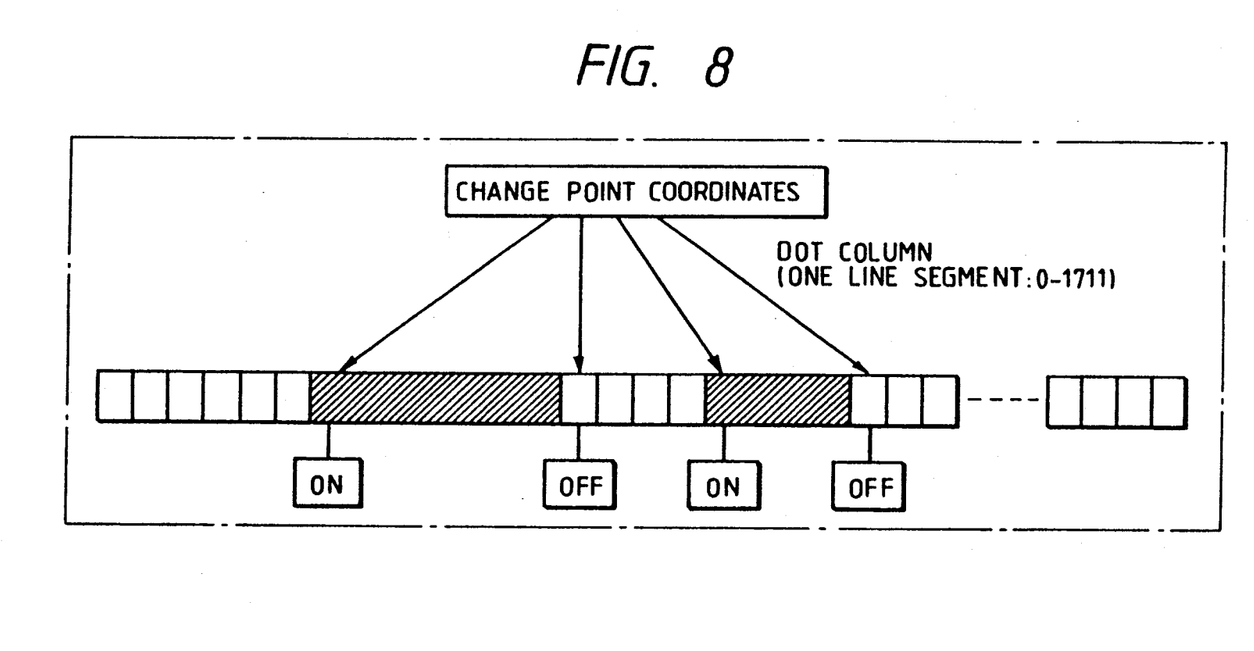
FIGS. 8 and 8a are diagrams showing the state of signal input to the electrostatic plotter of the present invention.
Figure 9:
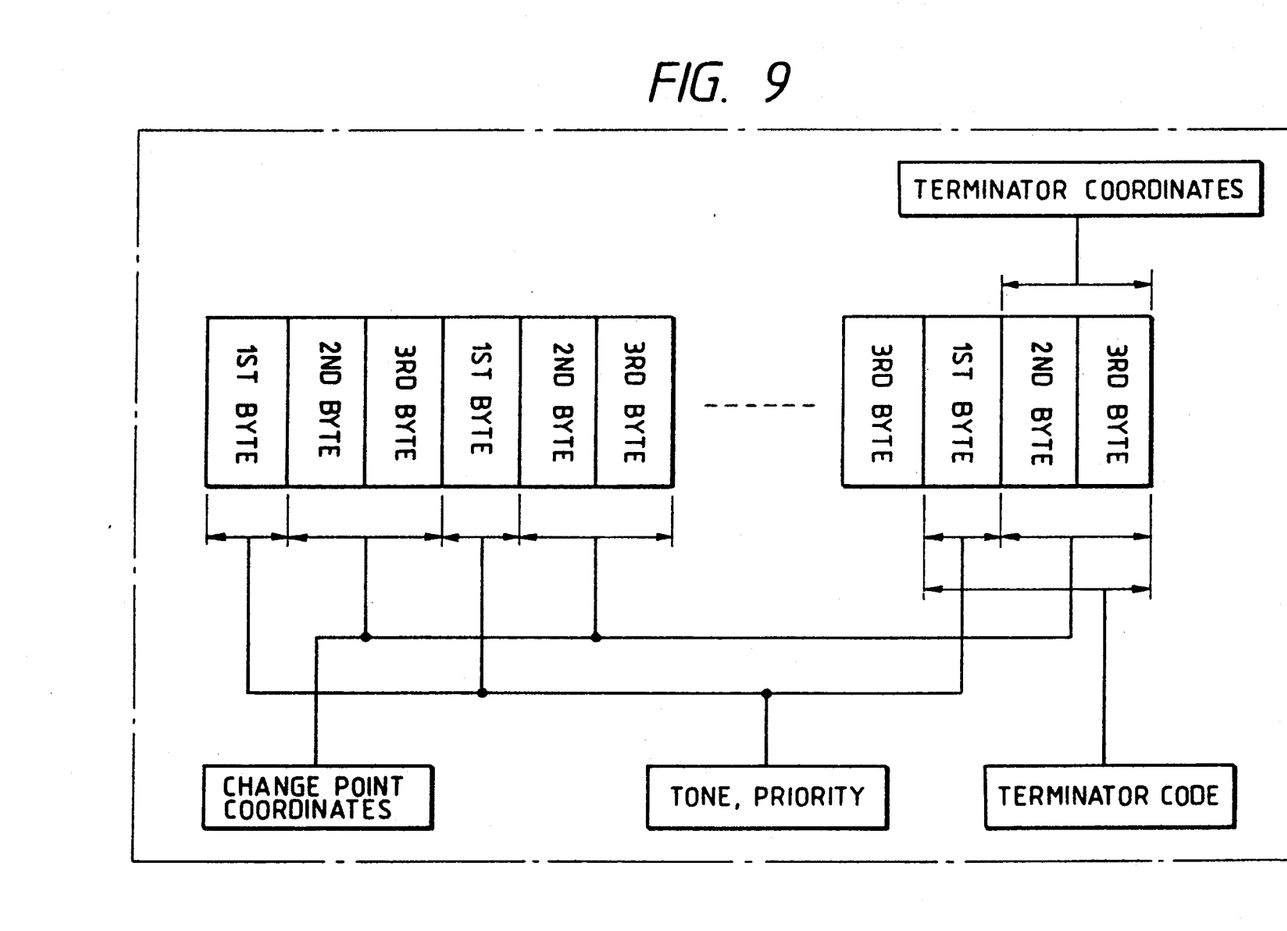
FIG. 9 is a diagram showing the state of signal input to the electrostatic plotter of the present invention.

In the device of the present invention, the image reader signal output to the electrostatic plotter 3 from comparator 40, as shown in FIG. 8 and FIG. 9, is output as a 6 bit signal. The image data contained in this 6 bit data, as shown in FIG. 8 is established as an ON, OFF signal of the change point coordinates in the initial section of the signal; for example, when ON it attempts to read a character and when OFF it attempts to read an image.

Thus, the data as described above, is established as concerns one line segment dot column (for example, in the example shown in the figure, 1712 bits are used), and through this one column is read at the electrostatic plotter 3. In this case, with regard to the signal from microcomputer 2, as described above, and the signal from film scanner 1 in the case where they are simultaneously input, the signal from the microcomputer 2 is given priority and as a result, when character data is required, the image is deleted and the character data is input. Further, signals are established at the end of each line to express the end of the line and to move to the next column.

In establishing each signal in the preferred embodiment of the present invention as described above, as shown in FIG. 8a, the initial bit of the first byte is established as an auxiliary bit, the second bit of the first byte is established as a priority bit, and tone is established in the third bit.

The auxiliary bit described above, as shown in FIG. 8a, contains both priority and tone data, which are indicated as 1 or 0. In the case of 1, this data expresses priority and tone data, and when this is 0, it expresses the address.

Figure 8A:
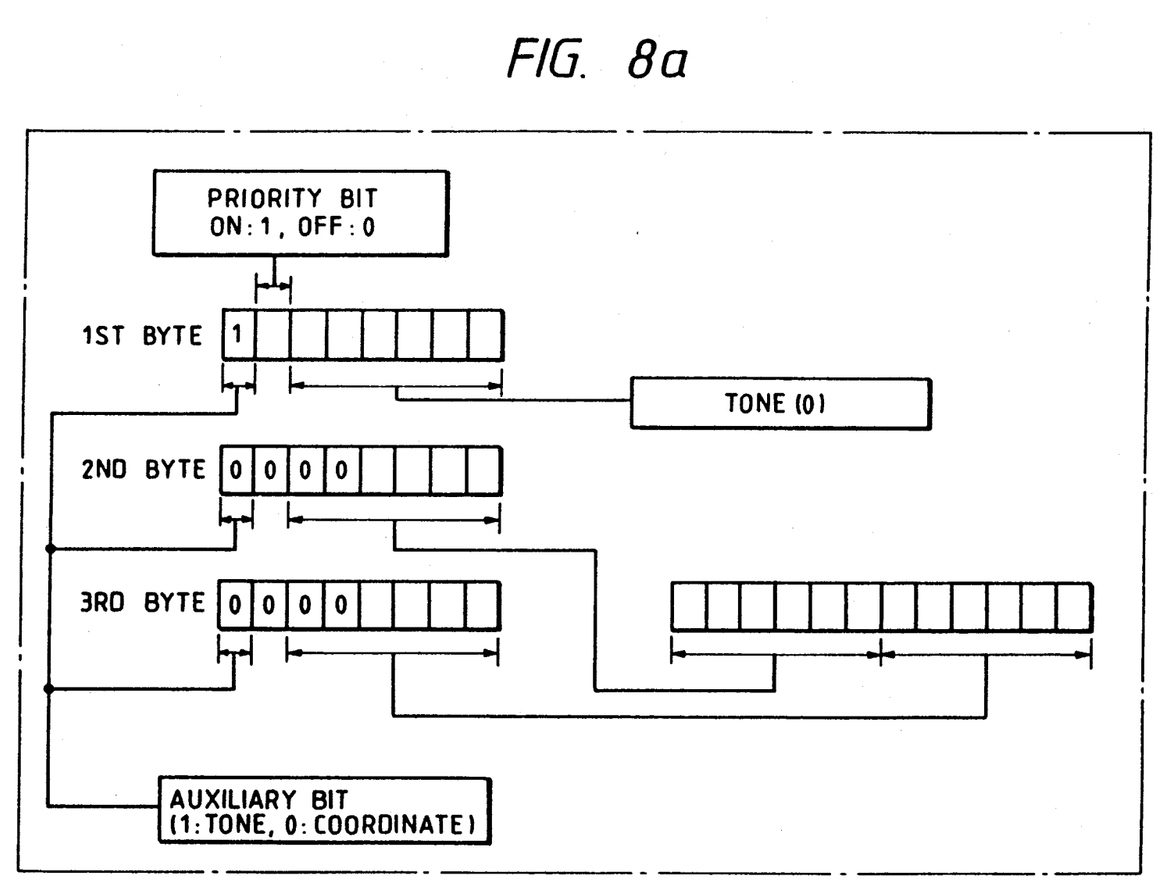

Further, in the second and third bytes, the initial segment auxiliary bit establishes a following 6 bit change point coordinate axis. Thus, through the parallel arrangement of the data as described above, the electrostatic plotter 3 outputs a produced image a column at a time, and on the basis of the signal, the data is output to the electrostatic plotter 3 and each column dot is expressed as an 8×8 dot.

The image data established as described above, as shown in FIG. 9, and the auxiliary bit change point coordinate axis are compared against the column corresponding to each data category, and a terminator code is established at the end of the column segment. The column change is indicated to the electrostatic plotter 3 through this code.

In the preferred embodiment of the present invention, in addition to the plotter as described above, a full color printer or selected device can be used with no limitations on its functions. As long as the printer has functions similar to the electrostatic plotter, a device of one's own selection may be used and the control circuit can be structured to suit the printer's characteristics.

Further, a microcomputer has been used as a means of designating character data; however, a device such as a general word processor can be used as a means of designating character input as long as it is capable of creating characters and outputting data.

As described above, in the device of the present invention, image data read by a film scanner 2 is processed at an image signal processor, converted to color data at the printer, and output from the said printer as a full color print.

Further, in the embodiment as described above, the production of a full color print is explained, however, the device of the present invention is applicable to the case of producing a two-color copy, and the case of producing a single-color copy. Even in these cases, the density of colors, image data, and character data are set based on a priority and tone data.

The image reader of the present invention can produce a full color print of an original image of one choice including inserted character data using a simply configured film scanner, microcomputer, and electrostatic plotter arrangement.

Further, in the device of the present invention, a large size full color print, such as Ao size, can be produced. Further, using a microcomputer to divide an image into sections of the image area, several smaller copies can be combined to produce a very large size print. The production cost of such a print is much less expensive than enlarging a photograph.

Additional advantages and modifications will readily occur to those skilled in the art. The invention in its broader aspects is, therefore, not limited to the specific details, and preferred embodiment shown and described. Accordingly, departures may be made from such details without departing from the spirit or copy of applicant's general inventive concept.

What is claimed is:

1. An image reader, comprising:
   reading means for reading image data from an original color film to generate an electrical image signal;
   image signal processing means for processing said electrical image signal;
   a microcomputer device for generating character data on a screen with an imaginary space, and outputting a character data signal; and
   printing means for producing a color print based on the image data signal from said image signal processing means combined with the character data signal from said microcomputer device,
   wherein when the image data signal is combined with the character data signal, the character data formed in the imaginary image space on the screen of said microcomputer device is developed into a bit map,
   the bit map in the imaginary image space is analyzed in the form of a line, and an address of a change point of the bit data and a density designation to the change point are successively made from one end of the line,
   data for said address and density designation is output in synchronism with printing colors of the printing means as multi-color data, and
   said address and density data include data which represents whether the image data to be combined with the address and density data is to be output in priority.

2. The image reader of claim 1, wherein a last portion of the density data and the change point address data which has been analyzed into said line and the density data have data representing the end of the line.

3. The image reader of claim 1, wherein when the character data formed in imaginary image space is output in synchronism with the printing colors of said printing means, there is provided data which represents the end of a page.

* * * * *